United States Patent [19]

Doessel et al.

[11] Patent Number: 5,527,605
[45] Date of Patent: Jun. 18, 1996

[54] MAGNETOOPTIC LAYER AND A PROCESS FOR ITS FABRICATION

[75] Inventors: Karl-Friedrich Doessel, Wiesbaden; Bernd Fischer, Wiesbaden-Nordenstadt; Ernst G. Schlosser, Kelkheim; Guenther Schmidt, Niedernhausen, all of Germany

[73] Assignee: Hoechst Aktiengesellschaft, Frankfurt am Main, Germany

[21] Appl. No.: 224,190

[22] Filed: Apr. 7, 1994

Related U.S. Application Data

[63] Continuation of Ser. No. 785,880, Nov. 4, 1991, abandoned, which is a continuation of Ser. No. 480,496, Feb. 16, 1990, abandoned.

[30]     Foreign Application Priority Data

Feb. 16, 1989 [DE] Germany ................. 39 04 611.7

[51] Int. Cl.⁶ ................ G11B 5/66; B32B 5/16; C23C 14/00
[52] U.S. Cl. .............. 428/332; 428/336; 428/610; 428/684 ML; 428/684 SC; 428/684.6 R; 428/684 NF; 428/684 MM; 428/684 T; 428/684 RF; 428/684 XS; 428/900; 428/638; 204/192.1; 204/192.2; 204/192.26; 363/13
[58] Field of Search ................ 428/694 ML, 694 SC, 428/694 GR, 900, 694 NF, 694 MM, 694 IS, 332, 336, 610, 694 XS; 369/13; 204/192.1, 192.2, 192.26

[56]     References Cited

U.S. PATENT DOCUMENTS

| | | | |
|---|---|---|---|
| 4,293,621 | 10/1981 | Togami | 428/694 |
| 4,649,519 | 3/1987 | Sun et al. | 365/122 |
| 4,670,356 | 6/1987 | Sato et al. | 428/693 |
| 4,694,358 | 9/1987 | Muchnik et al. | 360/59 |
| 4,740,430 | 4/1988 | Frankenthal et al. | 428/630 |

FOREIGN PATENT DOCUMENTS

| | | |
|---|---|---|
| 0126589 | 11/1984 | European Pat. Off. . |
| 0217096 | 4/1987 | European Pat. Off. . |
| 0225141 | 10/1987 | European Pat. Off. . |
| 0227480 | 7/1987 | European Pat. Off. . |
| 0229292 | 7/1987 | European Pat. Off. . |
| 3309483 | 9/1983 | Germany . |
| 3536210 | 4/1986 | Germany . |
| 3642161 | 6/1988 | Germany . |
| 009855 | 1/1985 | Japan . |
| 243844 | 12/1985 | Japan . |
| 243840 | 12/1985 | Japan . |
| 048148 | 3/1986 | Japan . |
| 184940 | 7/1988 | Japan . |
| 63-188843 | 8/1988 | Japan . |
| 2169742 | 7/1986 | United Kingdom . |

OTHER PUBLICATIONS

S. Takayama, et al., "Magnetic and Magneto–Optical Properties of Tb–Fe–Co Amorphous Films", J. Appl. Phys. 61(7), Apr. 1, 1987, American Institute of Physics, pp. 2610–2616.

S. Asari, et al. "Preparation of a Magneto–Optical Disk Using a Rare Earth–Transition Metal Alloy Target", J. Vac. Sci. Technol. A5(4), Jul./Aug. 1987, pp. 1949–1951.

E. Schultheiss, et al., "Production Technology for Magnetooptic Data Storage Media", Solid State Technology/Mar. 1988, pp. 107–112.

(List continued on next page.)

Primary Examiner—Leszek Kilman
Attorney, Agent, or Firm—Foley & Lardner

[57]     ABSTRACT

A magnetooptic layer made from rare-earth metals and transition metals exhibits a gradient in the alloy composition over the layer depth, and has a coercive field strength of more than 8 kOe in the temperature range of $\Delta T=100°$ C. around the compensation temperature $T_{comp}$. The layer is fabricated with a dynamic sputter process, in which the substrates to be coated are led past one or a plurality of sputter targets, arranged in a common plane parallel to the track of the substrates. A mask is located between the sputter targets and the substrates.

38 Claims, 6 Drawing Sheets

OTHER PUBLICATIONS

Masahiko Takahash et al., "Study on Recorded Domain Characteristics of Magneto–Optical tbFeCo Disks," Journal of Applied Physics, vol. 64 (1), Jul. 1, 1988, pp. 262–269.

S. Takayama et al., "Magnetic and Magneto–Optical Properties of Tb–Fe–Co Amorphous Films," Journal of Applied Physics, vol. 61 (7), Apr. 1, 1987, pp. 2610–2616.

S. Asari et al., "Preparation of a Magneto–Optical Disk Using a Rare Earth–Transition Metal Alloy Target," J. Vac. Sci. Technol., vol. A 5 (4), Jul./Aug. 1987, pp. 1949–1951.

E. Schultheiss, "Production Technology for Magnetooptic Data Storage Media," Solid State Technology, Mar., 1988, pp. 107–112.

M. H. Kryder et al., "Stability of Perpendicular Domains in Thermomagnetic Recording Materials," pp. 236–241.

MAGNETOOPTIC LAYER AND A PROCESS FOR ITS FABRICATION

This application is a continuation of application Ser. No. 07/785,880, filed Nov. 4, 1991, now abandoned, which is a continuation of Ser. No. 07/480,496, filed Feb. 16, 1990, now abandoned.

BACKGROUND OF THE INVENTION

The present invention concerns a magnetooptic layer made from an amorphous rare-earth/transition metal alloy having magnetic anisotropy, the easily magnetizable axis of which is perpendicular to the surface.

Amorphous magnetooptic materials having such a uniaxial perpendicular anisotropy are known. The most widespread are alloys of rare-earth metals, such as gadolinium, terbium and dysprosium, with transition metals, such as iron and cobalt, to which yet further components may be added. The magnetic properties of these alloys depend very strongly on their composition.

German Offenlegungsschrift 3,309,483 describes magnetooptic recording materials made from amorphous ternary alloys based on terbium, iron and cobalt. When the cobalt components are equal to or less than forty percent of the alloy there is an approximately linear relationship of both the angle of the Kerr rotation and the Curie temperature relative to the cobalt content of the alloys. The same holds for the magnetooptic recording media described in German Offenlegungsschrift 3,536,210 and in an article in *Journal of Applied Physics*, 64:262 (1988). Thus, a magnetooptic recording medium made from an amorphous film composed of rare-earth/transition metals and having a compensation temperature of 50° to 200° C., or a compensation temperature of 0° C. or less, is known from German Offenlegungsschrift 3,536,210. When an amorphous film of the Tb-Fe-Co system is used, the compensation temperature of 50° to 200° C. is achieved with a composition having 24 to 30 atom percent terbium, 7 to 20 atom percent cobalt, the remainder being iron, while a compensation temperature of 0° C. or less is attained with a composition having 18 to 21.5 atom percent terbium, 8 to 10 atom percent cobalt and the remainder being iron. These relationships are explained in detail in German Offenlegungsschrift 3,536,210.

Starting from page 2610 of an article in *Journal of Applied Physics*, 61 (1987) and from page 1949 of an article in *J. Vac. Sci. Technol.* A5 (1987), it is pointed out that, for example, increasing the terbium content by 1 atom percent can shift the compensation temperature by up to 40° C.

The control of the composition of the layer is therefore very important for design of the sputtering process and of a corresponding production plant, as discussed in *Solid State Technology*, March 1988, page 107.

In general, it is indicated that the deviation of the terbium concentration from the mean concentration in the layer volume is to amount to less than 0.5%.

The uniformity sought in the composition of the alloy components in the depth profile of a magnetooptic recording layer, together with the attempts to hold the alloy composition constant over the width and length of the coating require a high degree of effort, e.g., the disks to be coated rotate during the coating process about their own axis of rotation, and at the same time travel around on a sizeable circuit.

A further disadvantage of known magnetooptic recording materials is their high corrodibility.

To avoid or prevent this disadvantage, the addition of various anticorrosive substances or elements, respecitvely, to the magnetooptic allows is recommended (GB-A-2,175, 160; EP-A1-0,229,292). The addition of such substances to the entire volume of the magnetooptic recording layer improves the corrosion resistance, but at the expense of other desired properties, such as high Kerr angle, high coercive field strength, high writing sensitivity, high signal-to-noise ratio and the like. In the magnetooptic recording medium according to EP-A1-0,229,292, further anticorrosive substances are added to a first substance in order to achieve an enrichment of the anticorrosive substances at the surface of the recording medium. In this process it is disadvantageous that the desirable magnetooptic properties can be even more strongly impaired through the addition of further elements.

Thin barrier layers made from anticorrosive substances are described in U.S. Pat. No. 4,740,430. A discrete multiple-layer structure of the magnetooptic recording medium is produced.

In order to achieve a high storage density of the magnetooptic recording materials, it is necessary to produce stable domains which are as small as possible in the magnetooptic recording layer. A precondition for this is that the product of the saturation magnetization $M_S$ and the coercive field strength $H_C$ be as large as possible (Kryder et al., *SPIE Proc.*, Vol. 420, page 236 (1983)). For known magnetooptic recording materials, a product of the saturation magnetization and coercive field strength which is as large as possible is achieved only in a narrow temperature range around the compensation temperature $T_{comp}$.

More recently, magnetooptic recording materials have been described that are suitable for the direct overwriting of information (U.S. Pat. No. 4,694,358, U.S. Pat. No. 4,649, 519, EP-A2-0,225,141, EP-A2-0,227,480 and EP-A2-0,217, 096). In all cases, use is made of a construction of the magnetooptic recording medium in which two separate layers having different magnetic properties are stratified one above the other.

The publications EP-A2-0,217,096 and EP-A2-0,227,480 describe magnetooptic recording media in which a thermally insulating interlayer is present in the construction between the magnetooptic recording layer and a magnetic layer which generates a polarizing field. In the remaining citations from the literature mentioned above such interlayers are recommended because otherwise there can be diffusion of alloying components into the magnetic layer. Naturally, such a diffusion of alloying components alters the properties of the magnetooptic recording medium.

Another way to increase the long-term stability of a magnetooptic storage device is proposed in the process according to German Offenlegungsschrift 3,642,161, in which, during and/or after the successive deposition of a dielectric layer, a magnetooptic layer and a cover layer on a substrate, a curing treatment is carried out in a virtually dry atmosphere in a temperature range from room temperature to just below the crystallization temperature of the magnetooptic layer.

There is known from Japanese Published Specification 188,843/88 a process for fabricating a photomagnetic disk, in which the photomagnetic recording layer is sputtered on in such a way that the substrate moves past three targets made from rare-earth metal and transition metal. The central target is arranged parallel to the transport track of the substrate, with a target being mounted in front of and behind the central target in the direction of transport of the substrate at a predetermined angle with respect to the central target. The composition of the photomagnetic recording film thus obtained on the substrate is uniform.

SUMMARY OF THE INVENTION

It is therefore an object of the invention to provide a magnetooptic layer, having an easily magnetizable axis perpendicular to the surface of the layer, which can be fabricated simply and reproducibly, has a high corrosion resistance with respect to moisture and/or oxygen, makes possible high storage densities, and is suitable for direct overwriting.

It is a further object of the invention to provide a process of fabrication of such a magnetooptic layer.

These and other objects according to the invention are achieved by a magnetooptic layer comprising an amorphous rare-earth/transition metal alloy having magnetic anisotropy the easily magnetizable axis of which is perpendicular to the surface, wherein the magnetooptic layer exhibits a gradient in the concentration of the composition with depth and has a coercive field strength of more than 8 kOe in the temperature range of $\Delta T=100°$ C. around the compensation temperature $T_{comp}$.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is explained in more detail below with reference to the drawings, in which.

DETAILED DESCRIPTION OF THE PREFERRED EMBODIMENTS

A magnetooptic recording layer according to the present invention exhibits a gradient in the concentration of the composition with depth and has a coercive field strength of more than about 8 kOe in the temperature range of $\Delta T=100°$ C. around the compensation temperature $T_{comp}$ is provided.

In one embodiment of the present invention, the alloy consists of terbium, gadolinium, dysprosium, iron and cobalt, or of terbium, dysprosium, iron and cobalt. Furthermore, the alloy can consist of terbium, gadolinium, dysprosium and cobalt, or of terbium, dysprosium and cobalt alone. One of the alloys of the magnetooptic layer expediently has a composition according to the formula $$(Tb_xDy_{1-x})_y (Fe_zCo_{1-z})_{1-y}$$

where $0 \leq x \leq 1$, $0.15 \leq y \leq 0.30$ and $0.60 \leq z \leq 1$.

In a further embodiment of the invention, there is present in one or both surfaces of the magnetooptic layer a concentration of rare-earth metals which is enhanced by comparison with the average concentration of the composition, i.e., in which the concentration of rear-earth metals is greater than the average concentration of rare-earth metals in the composition.

It is likewise possible that there is present in one or both surfaces of the magnetooptic layer a concentration of transition metals which is enhanced by comparison with the average concentration, i.e., in which the concentration of transition metals is greater than the average concentration of transition metals in the composition.

A magnetooptic layer according to the invention is a component of a magnetooptic recording medium in which the magnetooptic layer is arranged between two barrier layers made from SiN, SiON, SiAlON, AlN, AlON, an oxide of tantalum or an oxide of niobium for protection against moisture and/or oxygen. One barrier layer is covered on one side by a substrate, and the other by a metallic mirror, a lacquer or adhesive layer and a second substrate.

The process for the fabrication of a magnetooptic layer is distinguished by the fact that the rare-earth/transition metal alloy is sputtered on dynamically by transporting the substrate to be coated relative to one or a plurality of sputter targets which are arranged in a common plane.

The magnetooptic layers according to the invention provide a directly overwritable magnetooptic recording medium, in a system in which a modulation of the magnetic field or a modulation of the laser energy takes place during the writing of the information.

Figure 1:
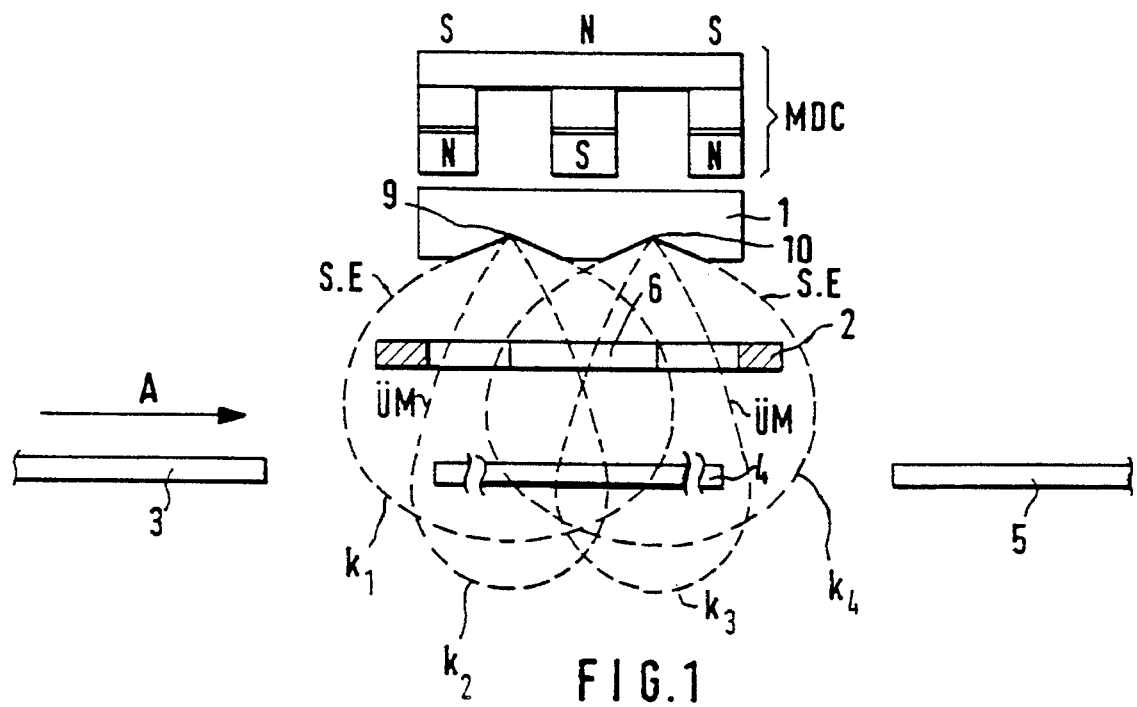
FIG. 1 shows a schematic representation of the arrangement of a target in a plane parallel to the track of the substrates to be coated.

Represented diagrammatically in FIG. 1 is an arrangement for the fabrication of a magnetooptic layer on substrates 3, 4 and 5, which are led past a sputter cathode in the form of target 1 in the direction of arrow A. Located between target 1 and the plane of the track of substrates, 3, 4 and 5 is mask 2 with opening 6 which, as will be explained later in further detail, can be formed asymmetrically in relation to the center of the sputter cathode or of target 1.

Target 1 has a composition of at least one element of the rare-earth metal RE and at least one transition metal TM. The rare-earth metals are generally terbium, gadolinium and dysprosium while the transition metals are first and foremost iron and cobalt. The target alloy can consist, inter alia, of terbium, gadolinium, dysprosium, iron and cobalt. It is possible to use a target alloy of terbium, dysprosium, iron and cobalt or of terbium, gadolinium, dysprosium and cobalt. A composition of terbium, dysprosium and cobalt is also suitable as a ternary alloy for target 1.

By way of example, a quantitative composition of the target alloy has the formula

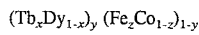

$(Tb_xDy_{1-x})_y (Fe_zCo_{1-z})_{1-y}$ where $0 \leq x \leq 1$, $0.15 \leq y \leq 0.30$ and $0.60 \leq z \leq 1$.

When a ternary alloy containing terbium as the sole element of the rare-earth metals is used as the target, a preferred composition is $Tb_{0.22-0.28} Fe_{0.70-0.64} Co_{0.08}$.

Target 1 is operated, for example, as a magnetron sputter cathode using a magnetron sputtering process known per se. The heart of the magnetron sputter cathode is a magnet system in which magnets with alternating poles are arranged on a soft-iron disk. A section through such a planar magnetron MDC is represented diagrammatically in FIGS. 1 and 2. The magnetron is connected electrically as the cathode, and the substrate holder as the anode or to a floating potential. Located between the electrodes is an ionized gas, for example argon, which is at a specific pressure, preferably $3 \times 10^{-3}$ mbar to $2 \times 10^{-2}$ mbar. Due to the magnet arranged behind the target, a nonhomogeneous magnetic field forms below target 1 and leads, in combination with the electric field, to a preferred sputtering of the target at sputter rifts 9, 10 marked in FIG. 1. Moreover, the RE metals and the TM are sputtered differently and give rise to different spatial distributions k1, k2, k3, k4, indicated in FIG. 1, for the rare-earth metals and the transition metals. These different spatial distributions, also termed sputter lobes, of the rare-earth metals and the transition metals are used in order, in dynamic magnetron sputtering with only one cathode or only one target, to obtain a specific concentration profile for the rare-earth metals over the depth of the magnetooptic layer. These depth profiles of the rare-earth metals RE and of the transition metals TM are represented in FIG. 3, in which the depth t of the magnetooptic layer is plotted on the abscissa axis, and the atomic percentages of the alloying components are plotted on the ordinate axis. If, for example, target 1 in FIG. 1 consists of a terbium-iron-cobalt alloy, terbium is distributed in accordance with the sputter lobes k1 and k4 in FIG. 1, and the transition metals iron and cobalt are distributed in accordance with the central sputter lobes k2 and k3. In this way, a magnetooptic layer is obtained which contains an "M"-shaped terbium concentration profile with two peaks, as may be seen from the rare-earth metal profile RE in FIG. 3, while the transition metal profile TM exhibits a single peak which, however, is higher than the two peaks of the terbium concentration profile.

The magnetooptic layer can, of course, also be fabricated in a diode or triode sputtering facility by a direct-current discharge. In such a diode sputtering facility, the substrate to be coated is connected, for example, as an anode, and the target forms the sputter cathode for this. By applying a voltage, a plasma is obtained between the two electrodes in a carrier gas, which is under a specific pressure. The ions of the carrier gas, which are accelerated in the electric field, knock out molecules or atoms from the target, which forms the cathode, and these are deposited on the substrate. In general, the magnetron sputtering process is preferred to the diode sputtering process since, by comparison with diode sputtering, higher sputter rates are obtained at reduced power, and much less heating of the substrates occurs, since only a few electrons impinge on the substrate, being instead deflected by the magnetic field of the magnetron cathode.

Due to the different sputter lobes for rare-earth metals and transition metals, there is present in the center of the magnetooptic layer a concentration of transition metals which is enhanced by comparison with the average concentration. There is also present at the edges and in one or both surfaces of the magnetooptic layer a concentration of rare-earth metals which is enhanced by comparison with the average concentration. It is clear from FIG. 3 that by suitable design of the masks, sketched by way of example in FIGS. 5A to 5D, which are mounted between the cathode and the substrate, an M-shaped profile of the rare-earth concentration can be achieved and a Λ-shaped and a V-shaped profile of the rare-earth concentration can occur. It is likewise possible to adjust the concentration distributions in the depth to virtually any type by suitable series connection of coating stations with overlapping sputter lobes.

Figure 2:
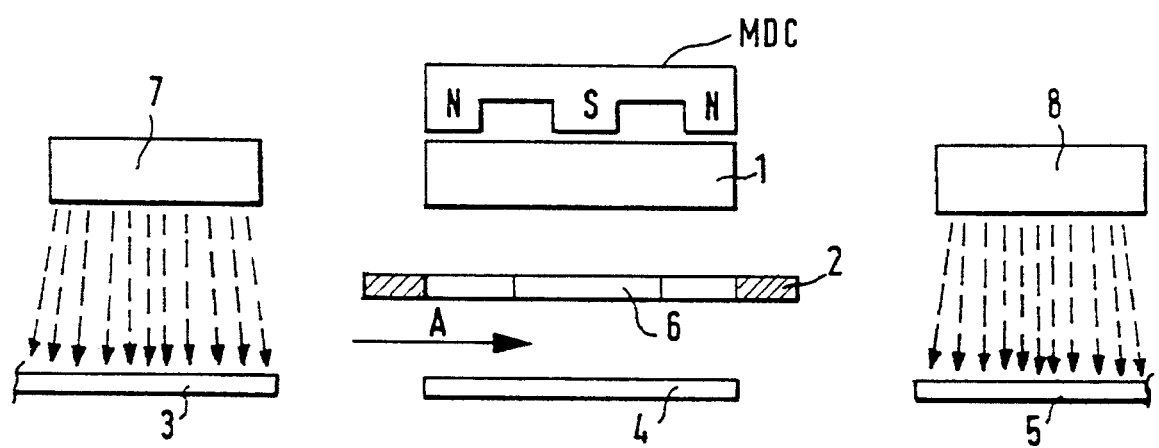
FIG. 2 shows a diagrammatic arrangement of a plurality of targets in a common plane parallel to the track of the substrates to be coated.
Figure 3:
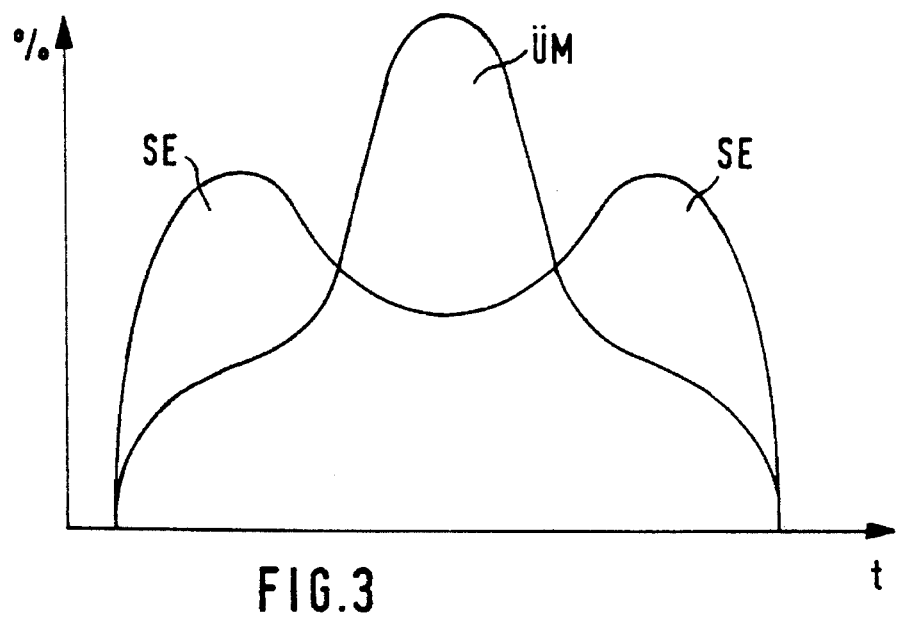
FIG. 3 shows, diagrammatically, the composition of a magnetooptic layer based on rare-earth metals RE and transition metals TM over the depth of the layer.

In the embodiment of a sputtering facility shown in FIG. 2, sputter cathodes are arranged next to one another in sputtering chamber 3 in a plane parallel to the direction of the transport A of substrates 3, 4 and 5 to be coated, the sputter cathodes consisting of targets 7, 1, 8 with different alloy compositions made from rare-earth/transition metals. For example, targets 7 and 8 are operated using the diode sputtering process, and target 1 using the magnetron sputtering process. It is likewise possible for all three targets to be operated using the diode sputtering process or using the magnetron sputtering process. It is likewise possible, by altering the gas flow and the sputtering power of the individual cathodes, to adjust the layer thickness profiles, i.e., the distribution of the alloy components. The close spatial proximity of the sputter cathodes causes a continuous transition of the concentrations of the alloying components. Since a discontinuity in the concentration is thereby avoided in the magnetooptic layer by comparison with a structure of discrete coats, there is a reduction in diffusion effects, which can occur in the case of repeated writing and erasing of the magnetooptic layer, and in changes associated therewith in the write/read characteristics.

The first target in the direction of transport of the substrate exhibits, e.g., a higher transition metal content, especially a higher cobalt content than the second target 1, seen in the direction of the transport.

On the side of the magnetooptic layer facing the substrate there is present, for example, an enhanced concentration of transition metals, especially an enhanced cobalt concentration, to enhance the signal-to-noise ratio, while the concentration of rare-earth metals is enhanced on the side of the magnetooptic layer away from the substrate.

It is also possible to use more than three sputter cathodes, for example, if at least one side of the magnetooptic layer is covered by a dielectric layer. Suitable, inter alia, as the dielectric layer are the barrier layers against moisture and/or oxygen described above. The thickness of this dielectric layer is chosen as approximately $\lambda/4n$ on the side facing the substrate, $\lambda$ being the wavelength of a writing laser and n the refractive index of the dielectric layer. On the side of the magnetooptic layer away from the substrate, the thickness of the barrier layer is smaller than or equal to the thickness of the barrier layer facing the substrate. The thickness of the magnetooptic layer amounts to about 15 to 100 nm.

The barrier layer or anti-reflective layer on the side of the magnetooptic layer facing the substrate has a thickness of approximately λ/5n, n being the refractive index of the layer, and λ being the wavelength of the laser light. A characteristic layer construction is as follows: substrate/70 nm±5 nm(Si,N)/80 nm±5 nmTbFeCo/50 nm±5 nm(Si,N), the refractive index n of the silicon nitride of the first (Si,N) layer being 2.20±0.1 and of the second (Si,N) layer being 2.05±0.1. The barrier layer on the side of the magnetooptic layer away from the substrate is, e.g., a reflective layer made from Ag, Cu, Au, TiN or ZrN. The following is an example of such a three-layer construction: substrate/70 nm±5 nm(Si,N)/25 nm±5 nmTbFeCo/50 nm±5 nm reflective layer. However, these three-layer constructions are less preferred than a four-layer construction in which a reflective layer is applied to a transparent barrier layer which is away from the substrate. Such a four-layer construction comprises, for example: substrate/70 nm±5 nm(Si,N)/25 nm±5 nm(TbFeCo)/30 nm±5 nm(Si,N)/50 nm±5 nm (Al).

If barrier layers are applied to both sides of the magnetooptic recording medium, sputtering is done from targets which lie ahead of target 7 or after target 8 in FIG. 2. In this process, the target (not shown) lying ahead of target 7 consists, for example, of silicon, silicon-aluminium, aluminium, tantalum or niobium. The diode sputtering process, or preferably the magnetron sputtering process, is applied in an argon and oxygen and/or nitrogen atmosphere. A layer of SiN, SiON, SiAlON AlN, AlON, an oxide of tantalum or an oxide of niobium is first formed on substrate 3 as a barrier layer against moisture and/or oxygen.

A further enhancement of the corrosion resistance of the resulting magnetooptic recording medium is obtained by sputtering on an anti-corrosive element in a sizable concentration from the cathode, to be precise target 7, lying ahead of the magnetron sputter cathode in the direction of transport or in the direction of the track A of the substrates. Target 7 can, for example, consist completely of an anticorrosive element, which can be titanium, chromium, aluminium, platinum, zirconium, vanadium, tantalum, molybdenum, tungsten, copper, ruthenium, rhenium, palladium, silicon, niobium, iridium and/or hafnium. Target 7 can also contain two or more of these elements in higher concentration, or consist entirely of two or more of these elements. Subsequent to the sputtering of this anti-corrosive layer onto the substrate provided with a barrier layer, the magnetooptic layer is sputtered on, as is described with reference to FIG. 1. In the last process step, an anticorrosive element is sputtered on from a target 8 which may have the same composition as target 7. In one or both surfaces of the magnetooptic layer, the anticorrosive element or elements exhibit a higher concentration after the sputtering by comparison with the average concentration of elements.

Figure 9:
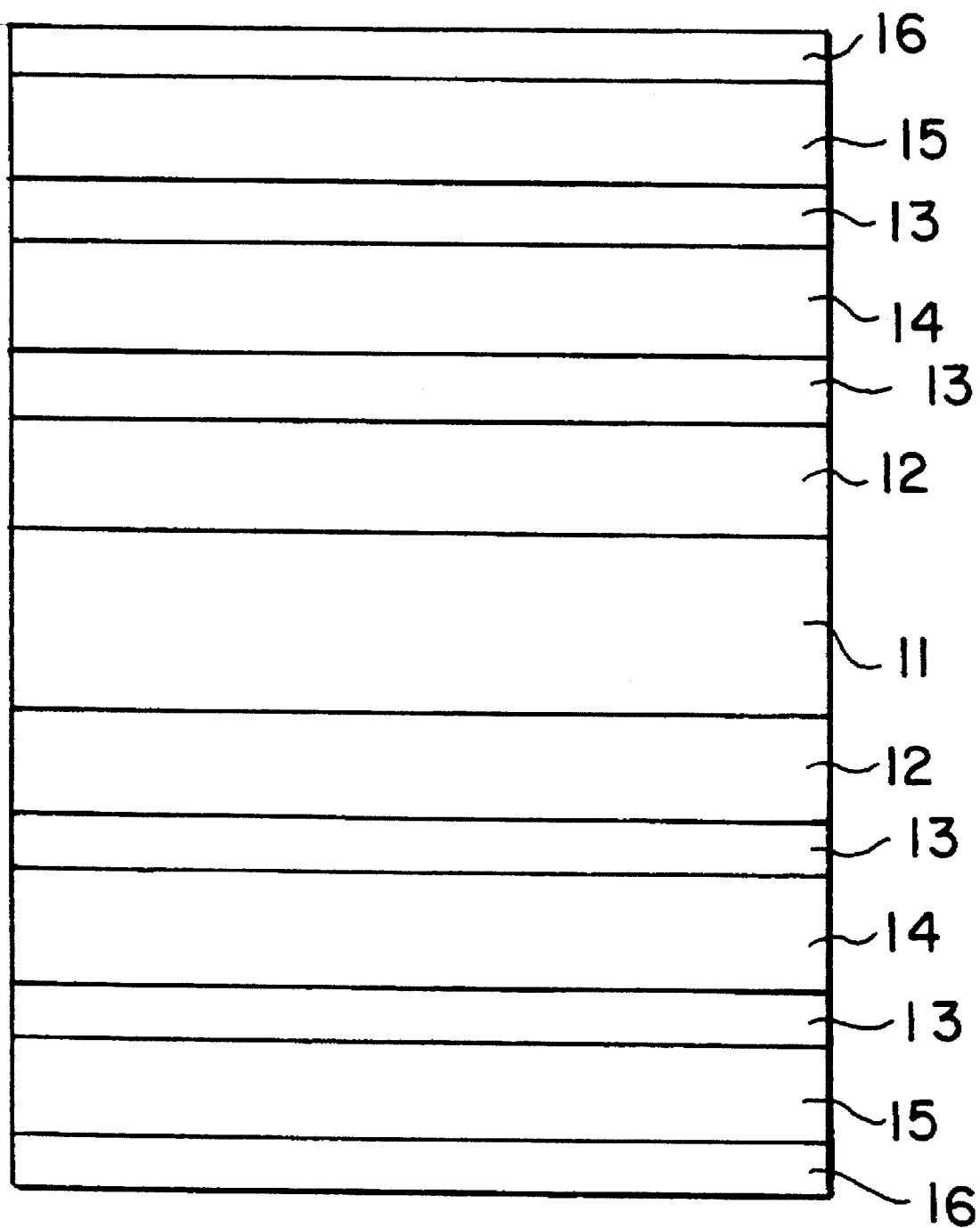
FIG. 9 shows a magnetooptic recording medium produced according to the present invention.

A magnetooptic recording medium comprising all the described layers is shown in FIG. 9, including substrate 11, inner barrier layers 12, anticorrosive layers 13, magnetooptic layer 14, outer barrier layers 15, and reflective layers 16. Inner barrier layers 12 may have anti-reflective properties and outer barrier layers 15 may have reflective properties, as described above. Various combinations of these described layers may be used.

Targets 7, 1, 8 in FIG. 2 have an approximate mutual spacing which corresponds to the spacing of the targets to the substrates to be coated. In this way, an overlapping of the sputter lobes can be achieved, and layers with any desired concentration distribution in the layer thickness can be fabricated.

Figure 5A:
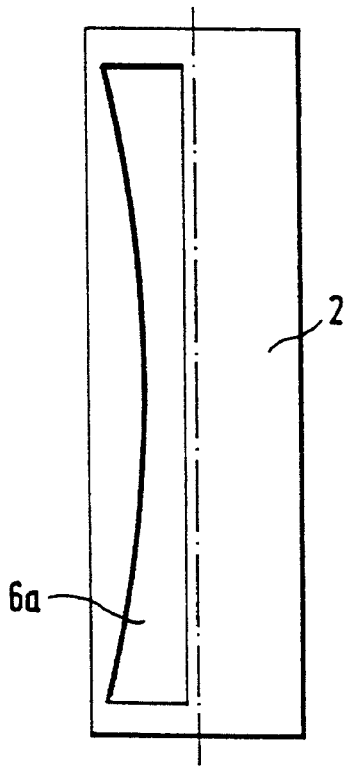
FIGS. 5A to 5D show a top view of various masks with different mask openings, which are arranged between the targets and the substrates.
Figure 5B:
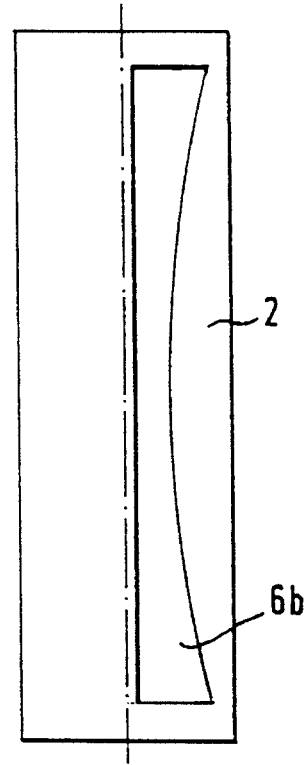

In order to obtain in the magnetooptic layer a depth profile of the rare-earth and transition metals which has an asymmetric concentration gradient over the depth, it is possible to arrange, between the plane of the substrates and the targets, the mask shown diagrammatically in FIG. 5A or 5B which exhibits mask opening 6a or 6b, formed asymmetrically in relation to the center of the sputter target or of the sputter cathode.

Figure 5C:
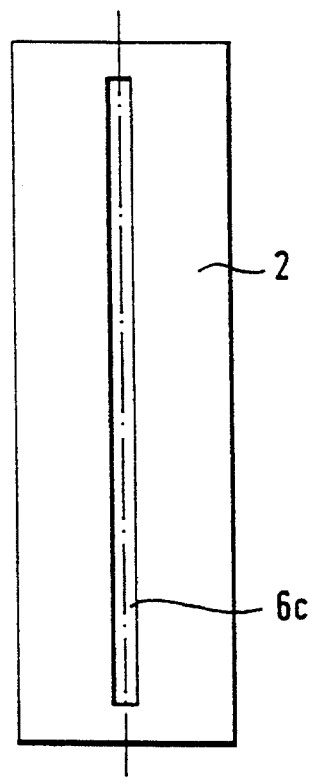
Figure 5D:
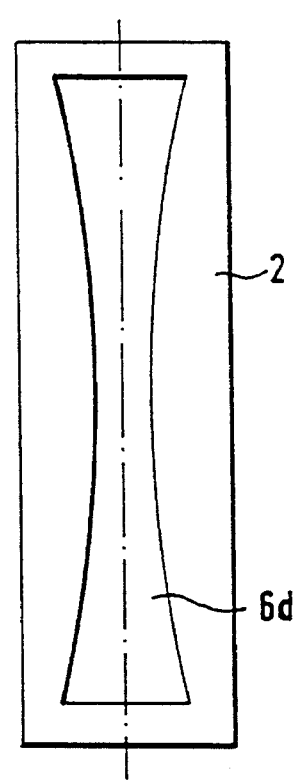

FIGS. 5A to 5D show different embodiments of such a mask 2, the mask having, according to FIGS. 5C and 5D mask opening 6c or 6d extending symmetrically to the center line.

Figure 4:
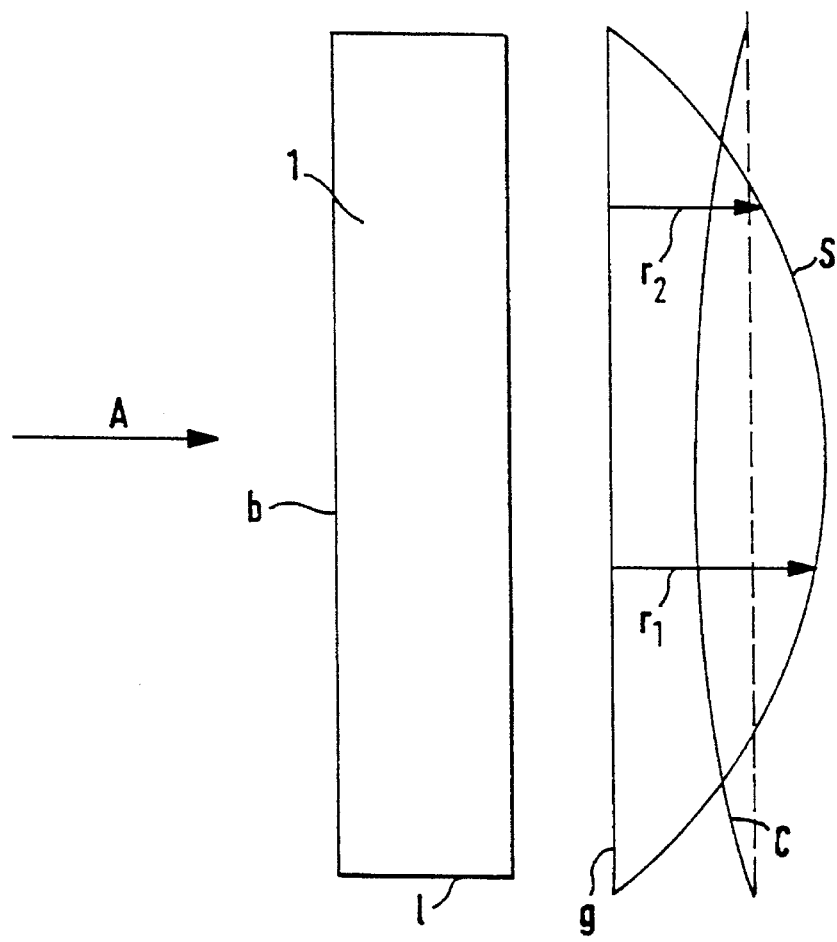
FIG. 4 shows a mask characteristic of a mask inserted between target and substrate, and the sputter rates over the depths of the magnetooptic layer.

The curve S above reference line g in FIG. 4 indicates the sputter rate for an element, for example a rare-earth metal RE, which is applied to the substrate without an inserted mask. The values r1, r2 are plotted as representatives of the individual local sputter rates. A sputter rate in accordance with curve C is obtained for the transition metals TM, its shape being altered by comparison with the shape for the rare-earth metals RE.

Target 1, from which sputtering is carried out, has width b perpendicular to the direction of transport A and a length l in the direction of transport A of the substrates.

The curves in accordance with FIGS. 6A to 6D reproduce the concentrations in atom % of the transition metals TM and of the rare-earth metals RE over the layer thickness or depth t of the magnetooptic layer. The substrate surface is marked on the t-axis in all FIGS. 6A to 6D.

Figure 6A:
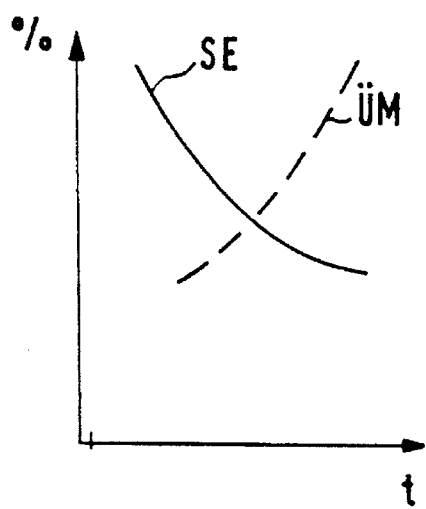
FIGS. 6A to 6D show, schematically, the composition of magnetooptic layers over the layer depths, which are obtained with the masks according to FIGS. 5A to 5D.
Figure 6B:
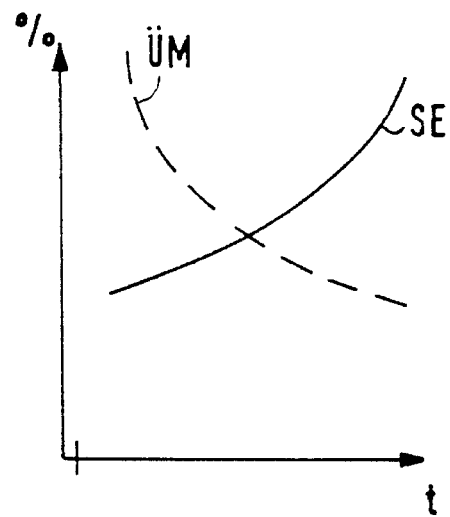
Figure 6C:
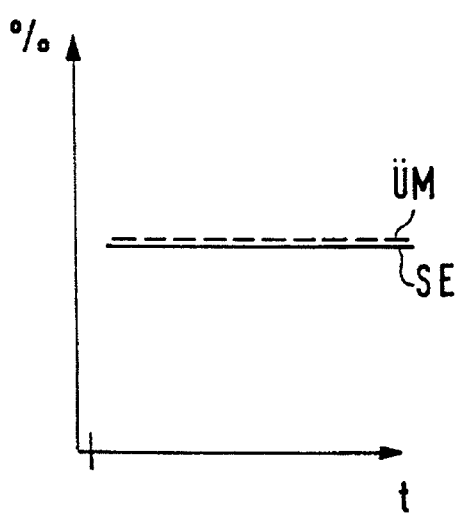
Figure 6D:
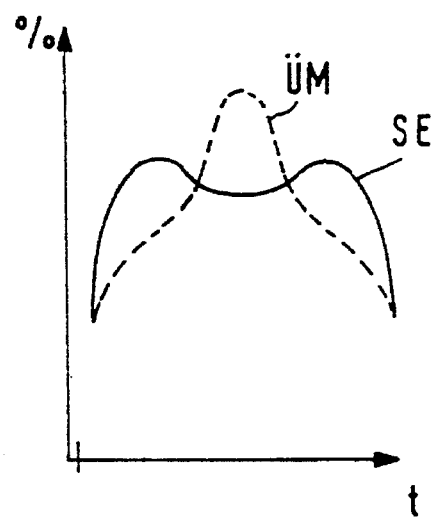

These curves are obtained by inserting the masks shown in FIG. 5A to 5D between the sputter target or targets and the substrate, the respective curves according to FIGS. 6A to 6D being assigned to the respective mask which is shown in FIGS. 5A to 5D, i.e., the two curves in FIG. 6A corresponding to the mask 2 in FIG. 5A, the two curves of FIG. 6B corresponding to the mask 2 in FIG. 5B, and so on. In FIG. 6A, the concentration of the rare-earth metals RE is highest at the substrate surface and decreases with the layer depth t, while the concentration of the transition metals TM gradually increases from a specific layer depth. The curves for the rare-earth metals RE and the transition metals TM in FIG. 6B behave like mirror images of the curves in FIG. 6A, and the mask in FIG. 5B is likewise arranged like a mirror image of the mask in FIG. 5A. In FIG. 6C, both the rare-earth and the transition metals exhibit an almost identical, constant concentration over the layer thickness, while the shape of the curves in FIG. 6D largely corresponds to the shape of the curves in accordance with FIG. 3.

Figure 7:
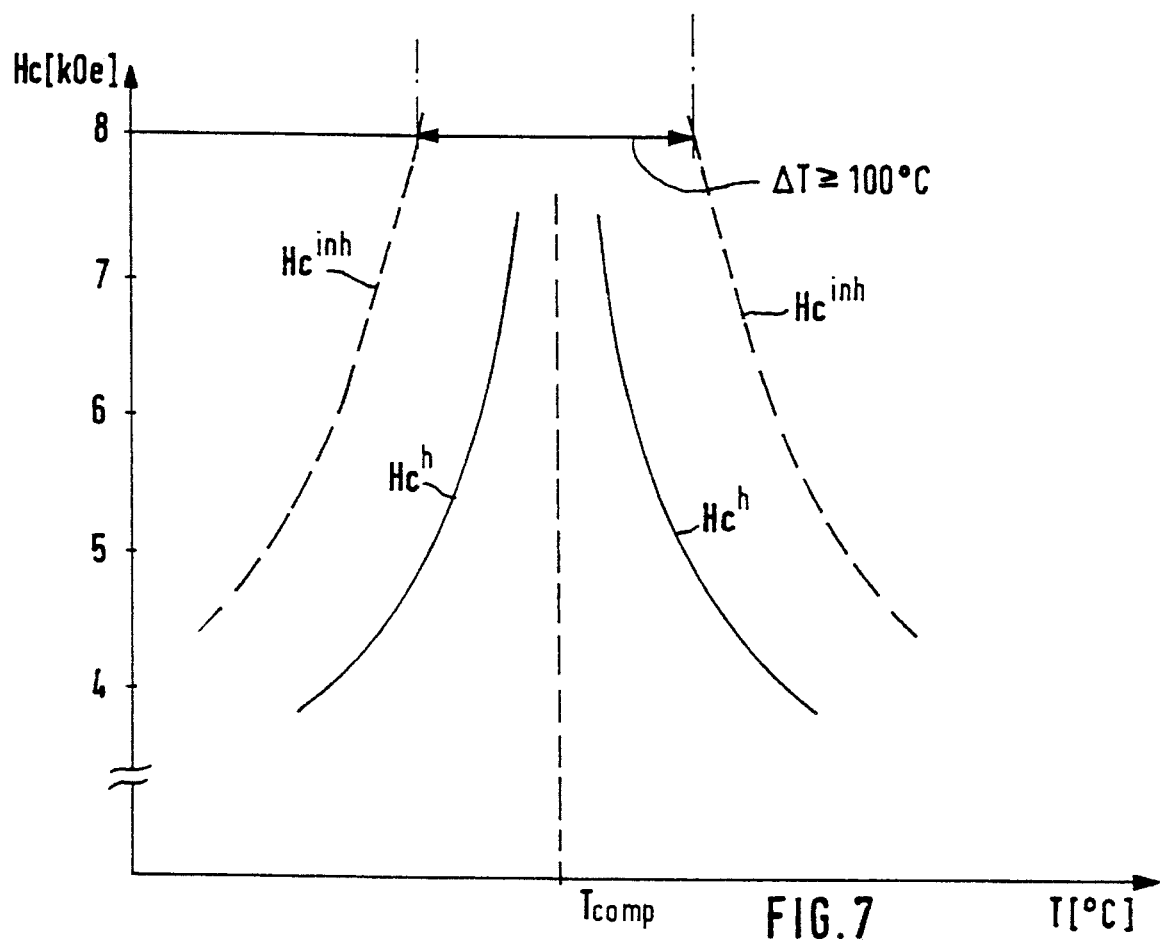
FIG. 7 shows the relationship between the coercive field strength $H_c$ and the temperature T of various magnetooptic layers.

The coercive field strength $H_c$, and the compensation temperature $T_{comp}$ are shown diagrammatically as a function of the temperature T for a known magnetooptic layer and for a layer according to the invention in FIG. 7. At the compensation temperature $T_{comp}$, the coercive field strength $H_c$ possesses a very marked maximum. In general, the compensation temperature $T_{comp}$ of a magnetooptic layer or alloy is obtained from the intersection of the two straight lines $1/H_c$, which are determined from the curves $H_c$ (T) on both sides of the ordinate of the maximum coercive field strength.

The coercive field strength for the layer according to the invention is designated by $H_c^{inh}$, while the coercive field strength for the known magnetooptic layer is $H_c^h$. The raised indices "h" and "inh" stand for homogeneous and inhomogeneous composition of the respective alloy, although it should be noted that the inhomogeneous magnetooptic layer according to the invention exhibits the same composition on average as the known homogeneous magnetooptic layer. Starting from a coercive field strength, $H_c$, equal to or greater than 8 kOe, a temperature interval $$\Delta T = T_{comp2} - T_{comp1} \geq 100° C.$$

of the compensation temperatures is obtained for the inhomogeneous layer composition as explained subsequently with reference to FIG. 8.

Figure 8:
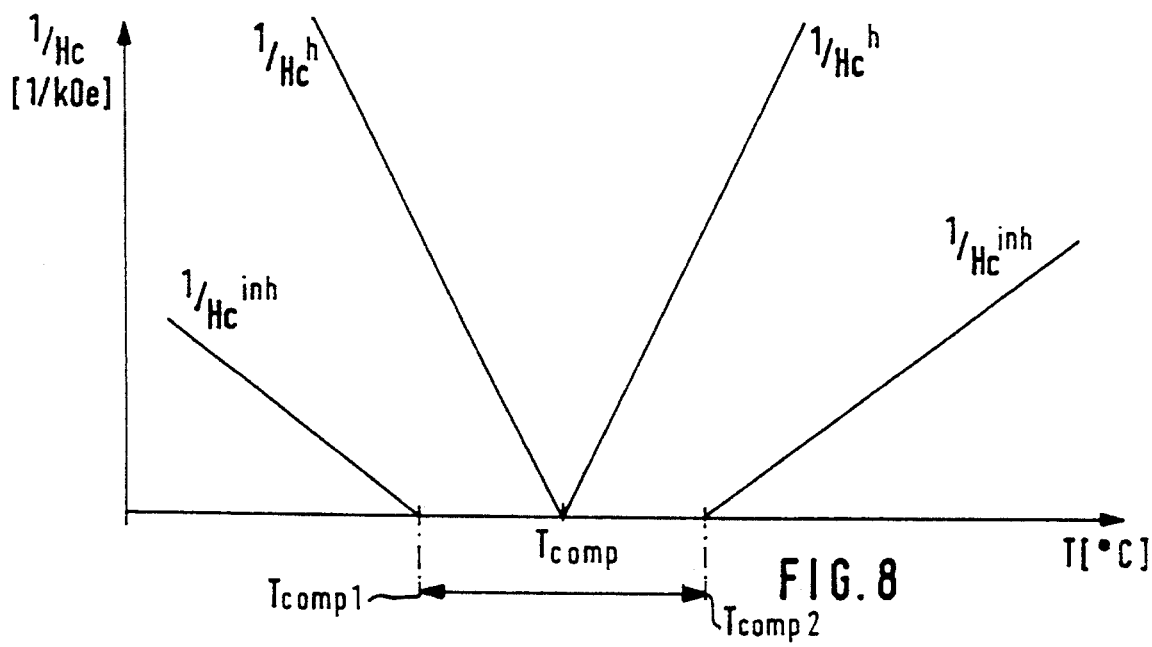
FIG. 8 shows the relationship between the reciprocal $1/H_c$ of the coercive field strength and the temperature T of the magnetooptic layers according to FIG. 7.

It is clear from FIG. 8 that the material according to the invention exhibits a dependence $1/H_c^{inh}(T)$ in the form of two rays which, compared to the rays $1/H_c^{h}(T)$ of the known materials have substantially shallower gradients. If $1/H_c^{inh}$ is extrapolated from high temperatures towards $1/H_c^{inh}=0[1/kOe]$ or, more precisely, towards 1/8 [1/kOe], the result is a compensation temperature $T_{comp2}=T_{8kOe2}$, while an extrapolation from low temperatures yields a compensation temperature $T_{comp1}=T_{8kOe1}$. In the case of the known magnetooptic materials, the same compensation temperature $T_{comp}$ is obtained for both extrapolations.

In the case of the material according to the invention, the difference, $\Delta T=T_{comp2}-T_{comp1}$ is equal to or greater than 100° C., which is the same as saying that the material characteristics with respect to fluctuations in the material composition are less sensitive than those of homogeneous materials.

In the case of the magnetooptic layer according to the invention, the magnetic properties differ substantially from the double layer, such as is described, for example, with reference to FIG. 3 of EP-A2-0,225,141. Upon magnetization, the magnetooptic layer according to the invention exhibits only a single hysteresis loop, by contrast with the double layer in the prior art, which exhibits two mutually separate hysteresis loops, and at the same time the magnetic properties of the magnetooptic layer according to the invention are much less strongly dependent upon the alloy composition. If the average terbium concentration is determined by X-ray fluorescence analysis and compared with the write/read characteristics, layers with 20 atom percent terbium show, within the limits of measurement accuracy, the same signal-to-noise ratio and the same sensitivity values as the layers with 24 atomic percent terbium. It has not previously been disclosed in the prior art that the proportion of the rare-earth metal or metals in the alloy can fluctuate within such wide limits without the magnetic properties thereby being substantially altered.

What is claimed is:

1. A magnetooptic recording medium comprising a magnetooptic layer of an amorphous ternary or quaternary rare-earth/transition metal alloy having magnetic anisotropy, the easily magnetizable axis of which is perpendicular to the surface, wherein the magnetooptic layer exhibits a gradient in the concentration of at least one of the rare-earth and transition metals of the composition which varies in the direction of thickness such that said layer is inhomogeneous, said inhomogeneous layer having a coercive field strength $H_c^{inh}$ dependent on the temperature T of the layer, wherein extrapolation of a plot of $1/H_c^{inh}(T)$ versus temperature from a temperature higher than the temperature for $1/H_c^{inh}=1/8$ [kOe] to a temperature towards $1/H_c^{inh})=1/8[1/kOe]$ results in a compensation temperature $T_{8kOe2}$ which equals $T_{comp2}$ at the intersection with the temperature axis and extrapolation of $1/H_c^{inh}(T)$ from a temperature lower than the temperature for $1/H_c^{inh}$ towards $1/H_c^{inh}=1/8[1/kOe]$ results in a compensation temperature $T_{8kOe1}$ which equals $T_{comp1}$ at the intersection with the temperature axis, wherein within the temperature range $T_{comp1}$ to $T_{comp2}$ equal to 100° C., the coercive field strength $H_c$ is equal to or greater than [8kOe].

2. A magneto-optic recording medium as claimed in claim 1, wherein the rare earth metals include at least one selected from the group consisting of terbium, gadolinium and dysprosium, and the transition metals include at least one selected from the group consisting of iron and cobalt.

3. A magnetooptic recording medium as claimed in claim 1, wherein the alloy consists essentially of terbium, dysprosium, iron and cobalt.

4. A magnetooptic recording medium as claimed in claim 1, wherein the alloy consists essentially of terbium, gadolinium, dysprosium, and cobalt.

5. A magnetooptic recording medium as claimed in claim 1, wherein the alloy consists essentially of terbium, dysprosium and cobalt.

6. A magnetooptic recording medium as claimed in claim 1, wherein the alloy has a composition according to the formula

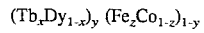

$(Tb_xDy_{1-x})_y (Fe_zCo_{1-z})_{1-y}$ where $0 \leq x \leq 1$, $0.15 \leq y \leq 0.30$ $0.60 \leq z \leq 1$.

7. A magneto-optic recording medium as claimed in claim 1, wherein there is present in one or both surface regions of the magneto-optic layer an increased concentration of rare-earth metals by comparison with the average concentration in the magneto-optic layer.

8. A magneto-optic recording medium as claimed in claim 1, wherein the magneto-optic layer additionally comprises at least one anticorrosive element.

9. A magneto-optic recording medium as claimed in claim 1, wherein the magneto-optic layer is covered on at least one side by a dielectric layer.

10. A magneto-optic recording medium having a magneto-optic layer as claimed in claim 1, wherein the magneto-optic layer is arranged between two barrier layers made from at least one member selected from the group consisting of SiN, SiON, SiAlON, AlN, AlON, an oxide of tantalum and an oxide of niobium.

11. A magneto-optic recording medium as claimed in claim 1, additionally comprising two barrier layers, wherein the barrier layer on the side of the magneto-optic layer facing the substrate has a thickness of approximately $\lambda/5n$, where n is the refractive index of the layer, and $\lambda$ is the wavelength of the laser light.

12. A magneto-optic recording medium as claimed in claim 2, wherein there is present in one or both surface regions of the magneto-optic layer an increased concentration of rare-earth metals by comparison with the average concentration in the magneto-optic layer.

13. A magneto-optic recording medium as claimed in claim 8, wherein the at least one anticorrosive element is selected from the group consisting of Ti, Cr, Al, Pt, Zr, V, Ta, Mo, W, Cu, Ru, Pd, Nb, Ir, Hf and Si.

14. A magnetooptic recording medium as claimed in claim 11, wherein the magnetooptic layer has a thickness of about 15 to 100 nm.

15. A magnetooptic recording medium as claimed in claim 11, wherein the barrier layer on the side of the magnetooptic layer facing away from the substrate has a thickness which is less than or equal to the barrier layer on the side of the magnetooptic layer facing the substrate.

16. A magneto-optic recording medium as claimed in claim 11, wherein the layer construction is, in the following order:

a substrate layer, a silicon nitride layer having a thickness of 70 nm±5 nm, a TbFeCo layer having a thickness of 80 nm±5 nm and a silicon nitride layer having a thickness of 50 nm±5 nm, the refractive index n of the silicon nitride layer nearest the substrate being 2.20±0.1 and the refractive index of the other silicon nitride layer being 2.05±0.1.

17. A magnetooptic recording medium as claimed in claim 11, wherein the barrier layer on the side of the magnetooptic layer away from the substrate is a reflective layer.

18. A magnetooptic recording medium as claimed in claim 1, wherein a reflective layer is applied to that barrier layer of the two barrier layers that is on the side of the magnetooptic layer facing away from the substrate.

19. A magneto-optic recording medium as claimed in claim 12, wherein there is present on the side of the magneto-optic layer facing the substrate an increased concentration of transition metals by comparison with the average concentration in the magneto-optic layer.

20. A magneto-optic recording medium as claimed in claim 13, wherein the anticorrosive element exhibits an increased concentration in one or both surface regions of the magneto-optic layer as compared to the average concentration of the anticorrosive element in the magneto-optic layer.

21. A magnetooptic recording medium as claimed in claim 17, wherein the reflective layer consists essentially of at least one of Ag, Cu, Au, TiN and ZrN.

22. A magneto-optic recording medium as claimed in claim 19, wherein there is present on the side of the magneto-optic layer facing the substrate an increased cobalt concentration by comparison with the average concentration in the magneto-optic layer.

23. A magneto-optic recording medium as claimed in claim 19, wherein there is present on the side of the magneto-optic layer away from the substrate an increased concentration of rare-earth metals in the magneto-optic layer by comparison with the average concentration in the magneto-optic layer.

24. A magneto-optic recording medium as claimed in claim 21, wherein the layer construction consists essentially of, in the following order, a substrate layer, a silicon nitride layer having a thickness of 70 nm±5 nm, a TbFeCo layer having a thickness of 25 nm±5 nm and a reflective layer having a thickness of 50 nm±5 nm.

25. A process for the fabrication of a magnetooptic layer as claimed in claim 1, wherein the rare-earth/transition metal alloy is sputtered by linearly transporting the substrate to be coated relative to one or a plurality of sputter targets which are linearly arranged in a common plane.

26. A process as claimed in claim 25, wherein the magnetooptic layer is fabricated by DC magnetron sputtering.

27. A process as claimed in claim 25, wherein at least one of the sputter targets consists essentially of rare-earth metals and transition metals.

28. A process as claimed in claim 25, wherein sputtering is done onto the substrate from more than one target, wherein the spacing between the targets is approximately equal to the spacing from the substrate to be coated to the targets, such that the sputtering produces sputter lobes of the rare-earth metals and the transition metals which overlap.

29. A process as claimed in claim 25, wherein sputtering is done onto the substrate from more than one target, wherein the spacing between the targets is greater than the spacing from the substrate to be coated to the targets, such that the sputtering produces sputter lobes of the rare-earth metals and the transition metals which do not overlap.

30. A process as claimed in claim 25, wherein a mask having an opening is inserted between the substrate and the target to produce an asymmetric concentration gradient with respect to depth in the magneto-optic layer.

31. A process as claimed in claim 25, wherein a mask having a symmetric opening in relation to a center line of the mask is inserted between the substrate and the target.

32. A process as claimed in claim 27, wherein at least one of the sputter targets comprises $$(Tb_xDy_{1-x})_y (Fe_zCo_{1-z})_{1-y}$$

where $0 \leq x \leq 1$, $0.15 \leq y \leq 0.30$ and $0.60 \leq z \leq 1$.

33. A process as claimed in claim 27, wherein at least one of the sputter targets comprises a composition $$Tb_xFe_yCo_z$$

where $0.22 \leq x \leq 0.28$ $0.64 \leq y \leq 0.7$, and $z = 0.08$.

34. A process as claimed in claim 28, wherein the first target in the direction of travel of the substrate exhibits a higher content of transition metal than the second target.

35. A process as claimed in claim 28, wherein the first target in the direction of travel of the substrate comprises cobalt.

36. A process as claimed in claim 28, wherein at least one cathode target is used which is operated as a magnetron, and at least one target is operated as a diode.

37. A process as claimed in claim 28, wherein first and second targets in the direction of travel of the substrate both comprise cobalt and wherein the first target in the direction of travel of the substrate exhibits a higher content of cobalt than the second target.

38. A process as claimed in claim 30, wherein the opening in the mask is asymmetric in relation to a center line of the mask.

* * * * *